Figure 1:
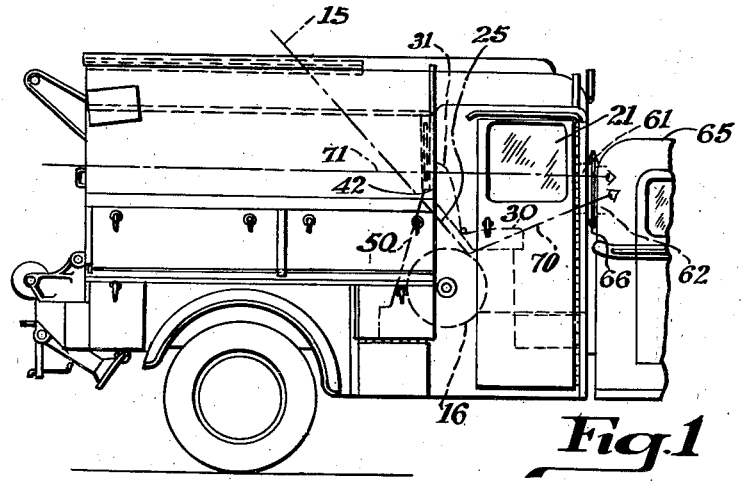

Sept. 2, 1947.  J. H. HOLAN, JR., ET AL  2,426,772
BODY FOR UTILITY TRUCKS
Filed Feb. 13, 1946  2 Sheets-Sheet 1

INVENTORS.
JAMES H. HOLAN JR. &
BY HERMAN J. TROCHE
Bates, Teare & M<sup>c</sup>Bean.
Attorneys.

Sept. 2, 1947.　J. H. HOLAN, JR., ET AL　2,426,772
BODY FOR UTILITY TRUCKS
Filed Feb. 13, 1946

INVENTORS. JAMES H. HOLAN JR. &
HERMAN J. TROCHE
BY Bates, Teare & McBean.
Attorneys.

Patented Sept. 2, 1947

2,426,772

UNITED STATES PATENT OFFICE 2,426,772

BODY FOR UTILITY TRUCKS

James H. Holan, Jr., Rocky River, and Herman J. Troche, Cleveland Heights, Ohio, assignors to The American Coach & Body Company, Cleveland, Ohio, a corporation of Ohio Application February 13, 1946, Serial No. 647,368

3 Claims. (Cl. 296—24)

This invention relates to vehicle bodies and particularly to those that are used for the maintenance and repair of public utility equipment.

Public utility repair and maintenance vehicles usually include a winch that is adapted to be driven from the motor by a power take-off device, and to be controlled by the driver who normally is seated within a cab that is independent of the body and positioned forwardly thereof. The winch is used for handling heavy loads, and for pulling cables, and is usually located as far forwardly as possible in the vehicle body so as to leave the main portion of the body clear for storing and handling relatively large objects that form part of the equipment and supplies in public utility work.

A further feature of body construction in public utility vehicles is the provision of a crew compartment which is located in the foremost portion of the body, and which is separated from the rearward portion by a partition. A seat extends entirely across the body in the crew compartment for the comfort and convenience of the men, and usually a window is provided in the front and back of the compartment through which the driver has attempted to observe the work that is being performed by the winch. The presence of the crew compartment seat, however, has obstructed the driver's observation of the winch, and has restricted the vision rearwardly to such an extent as to interfere greatly with the ability of the driver to receive directions from the crew for operation of the winch. It is desirable, however, to have the driver observe not only the operation of the winch and the position of the cable on the drum, but also to view the working end of the cable in order to control the drum instantly so as to minimize danger in operating the winch.

An object of the present invention is to retain the desirable forward mounting of the winch within the vehicle body, and to retain the crew compartment, but so arrange the seat construction that the driver has not only a direct vision of the rotating drum on the winch, but also a direct vision rearwardly through the vehicle body and on a line sufficiently low either to observe the free end of the cable or to receive directions from other members of the crew who are directing the movement thereof.

Figure 2:
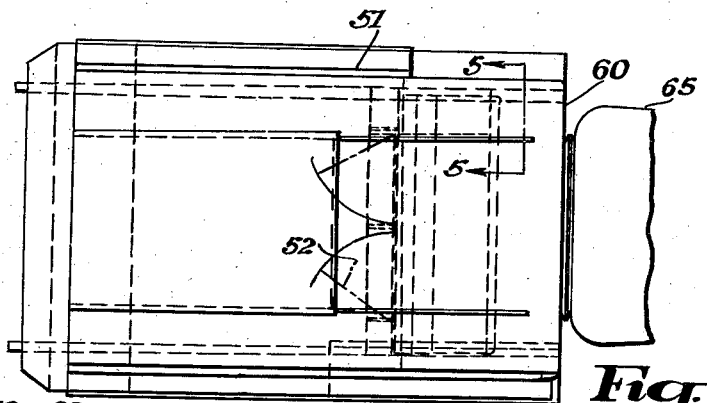
Figure 3:
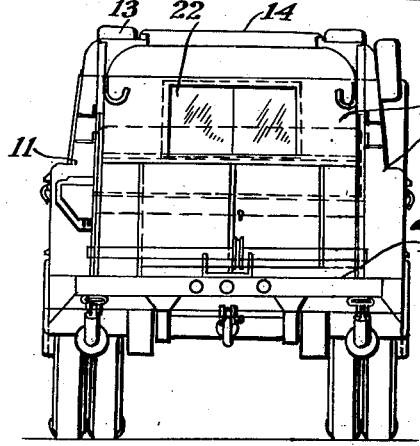
Figure 5:
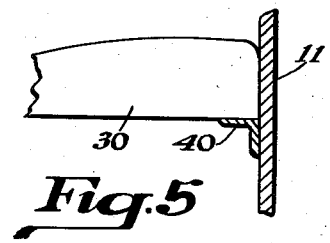
Figure 4:
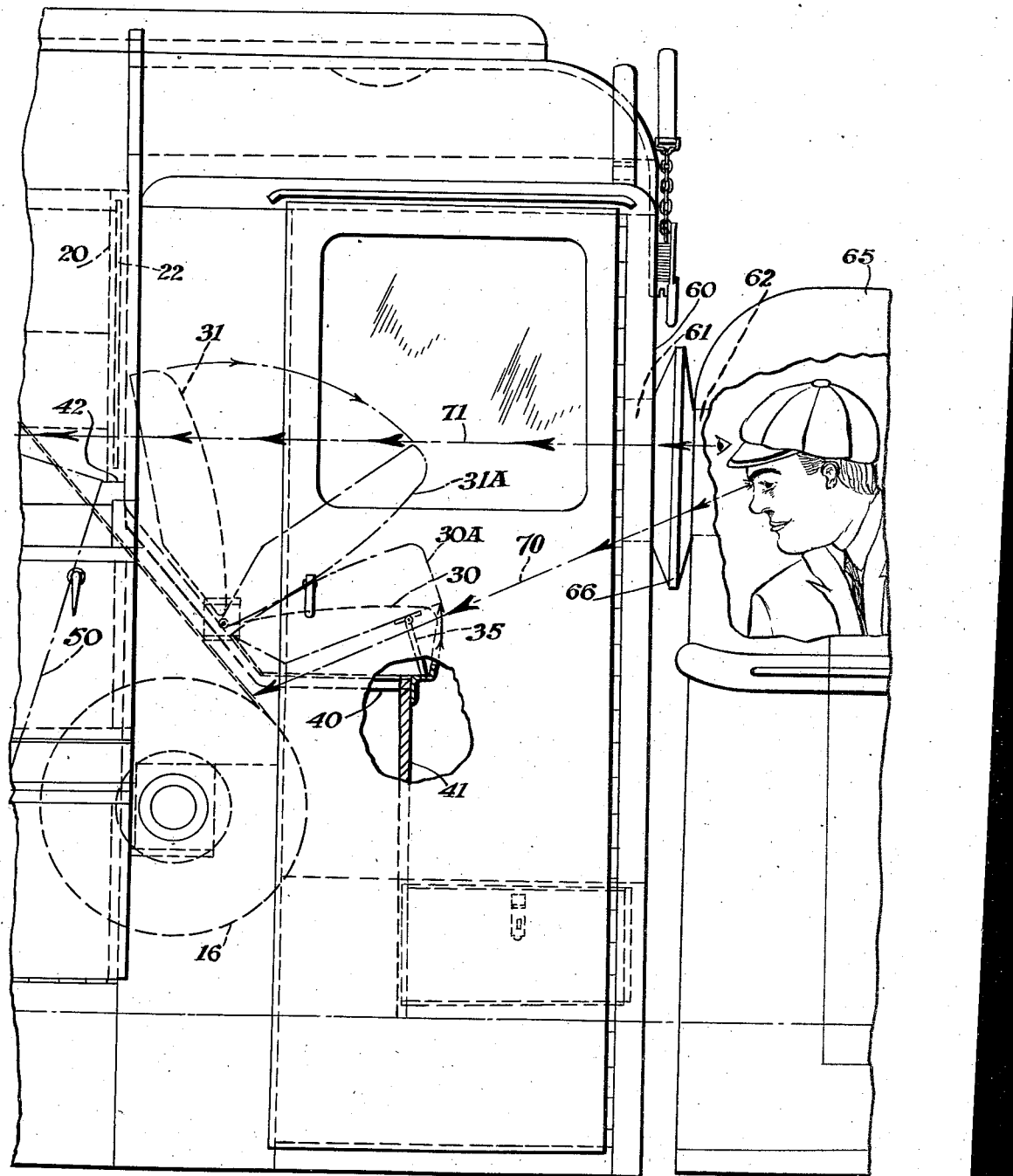

Referring now to the drawings, Fig. 1 is a side elevation of a vehicle body which includes the present invention; Fig. 2 is a top plan view thereof; Fig. 3 is a rear end view thereof; Fig. 4 is a partial side elevation of the vehicle body taken on a scale larger than that shown in Fig. 1, and Fig. 5 is a partial section taken on a plane indicated by the line 5—5 in Fig. 2.

The vehicle body with which our invention is illustrated has a floor 10, side walls 11 and 12, and a roof 13. A sliding cover 14 is disposed on the roof, by means of which a large portion of the roof may be opened for the passage of a cable 15 which leads from a drum 16 on a winch that is located in the forward portion of the body.

The body has a partition 20 extending transversely thereof which comprises the rear wall of a crew compartment 21 and the partition has a window 22 therein. The crew compartment is provided with a seat 30 and a back rest 31, the former of which is removable and the latter of which is hinged for swinging movement with respect to the vehicle body. The seat and back rest extend substantially entirely transversely of the vehicle body and for substantially the length of the crew compartment. The seat 30 normally occupies the position shown by the dotted lines 30 but is adapted to be tipped upwardly and to occupy the position shown by the dot-and-dash lines 30A, while the back rest 31 may be swung downwardly to the position shown by the dot-and-dash line 31A of Fig. 4. An arm 35 pivoted to the bottom of the seat 30 serves to hold it in the upper position, and the seat at such time supports the back rest when it is swung downwardly to the lowered position.

A supporting structure for the seat may include angle bars 40 which extend along the side walls of the body and may also include a panel 41 which extends beneath the seat adjacent the forward end thereof and downwardly to the floor and for the length of the crew compartment. The space between the top edge of the panel 41 and the bottom edge 42 of the partition 20 is normally closed by the seat and back rest when they are in the position shown by the broken lines 30 and 31. There is thus provided a well or chamber beneath the seat and back rest into which the winch may be positioned, where it is readily available for use, but does not obstruct the floor space in the body or interfere with the handling of relatively large objects therein. From the lower edge 42 of the partition 20, a panel 50 extends rearwardly and downwardly to close the well in which the winch is located and is provided with swinging doors 51 and 52 which when opened enable the cable to be withdrawn from the drum and attached to a load.

The forward wall 60 of the crew compartment has an opening 61 therein in registration with a similar opening 62 in the rear wall of the cab 65, which permits the driver to observe the operation of the winch and load. A hollow collapsible bellows-like member 66 surrounds the openings 61 and 62 and is attached at its ends to the body and cab respectively.

Assuming that the doors 51 and 52 are swung open and that the cable is paid out and attached to a load, then the seat 30 is raised to the position 30A and held in such position by the strut 35, and the back rest 31 is dropped to the position 31A. Thereupon the driver has a direct line of vision along the line 70 to the drum, and also rearwardly along the line 71 to the rearward portion of the vehicle where the crew normally is stationed when the winch is in use. The seat 30 is raised sufficiently high that a chalk mark placed on the cable will indicate to the driver when the rotation of the drum should be stopped, or when the drum should be stopped due to any fouling of the cable upon the drum. The back rest is dropped sufficiently low that the driver can readily receive signals from the men who are either in the vehicle body or on the ground at the rear thereof.

A feature of the present invention is the fact that the advantageous use of a crew compartment, together with a mounting of the winch within a well underneath the seat is retained without sacrificing the space that would otherwise be available within the vehicle body for storing and handling relatively large objects. A further feature is the fact that the driver may remain in the cab where the controls for the engine and power take-off mechanism are located, and yet can observe all the necessary movements of the drum and cable to expedite the handling of the winch and to minimize the danger of injury to the crew.

We claim:

1. A vehicle body having a crew compartment located in the forward portion thereof and having a driver's cab separate from the body and positioned forwardly thereof, said body and cab having registering openings through which the driver may have a line of vision into the crew compartment and through it to the rear of the body, said compartment having a crew seat and back rest therein extending transversely of the body, there being a winch disposed beneath the seat and back rest and normally concealed from the view of the driver by the seat, means for supporting the seat in elevated position so as to expose the winch to the view of the driver, said back rest normally obstructing the view of the driver to the rearward portion of the body, said back rest being swingable about a pivot adjacent the lower end thereof so as to clear the line of vision of the driver rearwardly through the compartment and to the rear of the body.

2. A vehicle body having a partition therein extending transversely thereof and dividing the body into a crew compartment and a storage compartment, the crew compartment having openings in the forward and rearward portions thereof, a driver's seat positioned forwardly of the crew compartment, the compartment having a seat and back rest therein extending transversely of the body and from one side to the other thereof, said seat and back rest providing a well therebeneath, a winch disposed within said well, said seat in the normal position preventing visibility of the winch by the driver, means for holding the seat in elevated position sufficient to permit a driver to observe the operation of the winch, said back rest normally restricting the rearward vision of the driver and said back rest being swingable forwardly and downwardly so as to clear the vision of the driver rearwardly.

3. A vehicle body having a crew compartment in the forward portion thereof and having a back wall therefor, a driver's seat positioned forwardly of the crew compartment, said wall having an opening therein, the compartment having a seat and a back rest therein extending transversely of the body and from one side to the other thereof, said seat providing a well therebeneath, a winch disposed within said well, said seat in the normal position preventing visibility of the winch by the driver and said back rest in the normal position obstructing visibility of the driver into the rear of the body, said seat being pivotally mounted at its rearward end and the back rest being pivotally mounted at its lower end, the seat operating when swung upwardly to expose the winch to the view of the driver, and said back rest when swung downwardly operating to clear the line of vision of the driver rearwardly through the compartment and to the rear of the body.

JAMES H. HOLAN, Jr.
HERMAN J. TROCHE.

REFERENCES CITED

The following references are of record in the file of this patent:

UNITED STATES PATENTS

| Number | Name | Date |
|---|---|---|
| 1,944,439 | Larsen | Jan. 23, 1934 |
| 2,159,022 | Hawkins | May 23, 1939 |
| 2,192,207 | Stahl | Mar. 5, 1940 |
| 1,589,460 | Cosgrove | June 22, 1926 |
| 1,304,202 | Richner | May 20, 1919 |
| 2,396,039 | Burton et al. | Mar. 5, 1946 |
| 1,860,076 | Callison | May 24, 1932 |